US006552753B1

United States Patent
Zhurbinskiy et al.

(10) Patent No.: US 6,552,753 B1
(45) Date of Patent: Apr. 22, 2003

(54) METHOD AND APPARATUS FOR MAINTAINING UNIFORM SOUND VOLUME FOR TELEVISIONS AND OTHER SYSTEMS

(76) Inventors: Ilya Zhurbinskiy, 2228 Coles Ave., Scotch Plains, NJ (US) 07076; Boris Yankilevich, Hanavy Hagai 1/9, Ashdod 77463 (IL)

( * ) Notice: Subject to any disclaimer, the term of this patent is extended or adjusted under 35 U.S.C. 154(b) by 68 days.

(21) Appl. No.: 09/692,493

(22) Filed: Oct. 19, 2000

(51) Int. Cl.⁷ .................................................. H04N 5/60
(52) U.S. Cl. ......................... 348/738; 348/725; 348/734
(58) Field of Search ................................ 348/738, 725, 348/722, 734; 381/1, 2, 17; H04N 5/60, 5/44, 5/222

(56) References Cited

U.S. PATENT DOCUMENTS

| | | | |
|---|---|---|---|
| 4,238,766 A | 12/1980 | Masuda | 358/86 |
| 4,385,204 A * | 5/1983 | Wine | 348/738 |
| 4,398,193 A | 8/1983 | Kuniyoshi et al. | 340/825.76 |
| 4,748,501 A | 5/1988 | Long | 358/86 |
| 4,837,627 A | 6/1989 | Mengel | 358/191.1 |
| 4,937,672 A * | 6/1990 | Anderson | 348/738 |
| 5,054,071 A | 10/1991 | Bacon | 381/12 |
| 5,442,452 A | 8/1995 | Ryu | 358/335 |
| 5,631,714 A | 5/1997 | Saadoun | 348/738 |
| 5,822,018 A | 10/1998 | Farmer | 348/705 |

* cited by examiner

Primary Examiner—Sherrie Hsia
(74) Attorney, Agent, or Firm—Steven Horowitz

(57) ABSTRACT

Apparatus for maintaining uniform volume in television or audio system forms part of television set and contains an eight-bit DSP having a CPU, RAM and ROM memory, an analog digital convertor, a voltmeter and a timer and switch, a "SAVE" button. When the user begins listening to a first channel, the user experiments with the volume desired and once the user has it the user pushes the "SAVE" button on the TV set which activates the voltmeter to measure the volume of the tension on the output of the sound amplifier, and correspondingly the loudness level, at a number of intervals to capture variations occurring during the show. DSP calculates a mean volume of the tension which is then transmitted to the RAM and retained in memory. The DSP switches off the apparatus. When the user subsequently switches to a second channel the apparatus switches on and the voltmeter measures the volume of the tension of the second channel at a number of intervals, the digital signal processor calculates the mean level and once again transmits that mean volume of the tension level to the RAM. The DSP calculates the difference between the mean volume of the tension of the saved tension and that of the second channel. If there is a difference in volumes of the tension level, the DSP sends a signal to the apparatus to adjust the volume of the tension until the difference becomes zero. In preferred embodiment, voltmeter measurement is first done crudely, then precisely.

12 Claims, 6 Drawing Sheets

Volume

METHOD AND APPARATUS FOR MAINTAINING UNIFORM SOUND VOLUME FOR TELEVISIONS AND OTHER SYSTEMS

The present invention relates to methods and apparatus for maintaining uniform sound volume of television receivers and audio systems, and more particularly such receivers and systems when using a successive multichannel regime in a television set and successive audio broadcasts on audio systems.

Television sets have buttons on the front panel and on a remote control device that are used to change television stations and the volume of sound coming from the television set for both regular or cable stations. It is well known that there is a problem in the variation of the loudness of sound emanating from a television set when the viewer/listener changes channels. The variation of sound from different channels of broadcasting is typically up to plus or minus twenty or twenty-five per cent. The reason for the variation is that the volume of the audio signal is a product of (i) the amplitude of the incoming sound signal and (ii) the amplification of the signal during its path in the television receiver. The amplitude of the sound signals on different channels is often not the same because of many factors including the fact that the signals come from different countries and regions where there is a variance in quality of retranslating, differences between cable companies, differences in the television disposition of the satellite antenna and other factors. Accordingly, it is impossible beforehand to determine the correct loudness of the sound heard by the user and simply incorporate that sound level into the memory of the television set. In addition, different individuals might have different preferred sound levels.

In the prior art attempts have been made to address this problem. For example, U.S. Pat. No. 5,631,714 to Saadoun is a system for automatically adapting the mean sound level of a television receiver involving both video and audio signals. The sound level of the signals are adjusted on the television receiver. Saadoun has several drawbacks. For example, one characteristic of the system in Saadoun is that the manufacturer of the television set must determine the average user's preferred level of sound volume at the point of manufacture in the factory and then build that into the system. This characteristic results in two drawbacks. First, individual preferences for preferred sound volume may vary and adequate consideration for this would not be provided by the system of Saadoun. In addition, even the same individual may need to vary his or her preferred sound volume depending on mood, time of day, etc. Second, the incoming audio signals differ in volume depending upon which country or region in the world they are sent from. It would be cumbersome for different settings to have to be made for each possible source of audio signal in the world.

An additional characteristic of Saadoun that does not adequately address the problem of variations in sound volume is that in its system the audio signals are adjusted at the point of their entry into the television set rather than at the point of output from the television to the ears of the listener/viewer. At the point of input there is a smaller magnitude of variations in sound volume from different channels of broadcasting than there is at the point of output. This is because the difference between the level of sound on different channels of broadcasting grows substantially after the audio signal passes the amplifying path of the television set and remote control device. Accordingly, creating uniformity at the point of the input of the television set would not solve the problem completely because there would likely be at least some minute variations in sound volume remaining and these remaining variations would then be magnified after the audio signal passes the amplifying path of the television set and travels to the ear of the listener/user.

Another characteristic of Saadoun that does not adequately address the problem of variations in sound volume is that the system of Saadoun may not be capable of adjusting the sound level for very high sound volumes coming from a new channel. Finally, the system in Saadoun does not achieve an acceptable degree of uniformity of sound.

U.S. Pat. No. 4,238,766 to Masuda is a channel level adjusting apparatus for equalizing the amplitude level of received television signals of a plurality of channels. Masuda utilizes band pass filters and circuits that shift the phase of the signals and that adjust the signals on the input of the television receiver.

What is needed is a method and apparatus for achieving uniform sound volume coming from a television set or audio system that is effective regardless of the source of the television signal, that allows the user's sound volume preferences to be considered, that operates on the output of the television receiver, is not cumbersome, is effective for volume deviations likely to be found in any television set, is simple to construct and is simple for the user to use. The present invention attains all of these features and more and is applicable also to other audio systems.

OBJECTS AND ADVANTAGES

The following important objectives and advantages of the present invention are:

(1) to provide a method and apparatus for maintaining uniform sound volume heard from any station of a television set or other audio system, (2) to provide such a method and apparatus of maintaining uniform sound volume of a television without having to determine at the point of manufacture what the preferred volume of a typical user is but rather by allowing the individual user to select that user's preferred sound volume, (3) to provide such a method and apparatus that allows the same individual to achieve uniformity of sound volume at a different level of volume depending upon the time of day, the individual's mood or other subjective or individual factors, (4) to provide a method and apparatus of maintaining uniform sound volume where the user of the audio system fitted with the apparatus of the present invention can select a preferred volume by hitting on a single occasion a single button on the outside panel of the television set or other audio system or on the remote control device, (5) to provide a method and apparatus of maintaining uniform sound volume of signals from a television set on any channel wherein the audio signals are adjusted at the point of output to the ears of the listener/user after passing the amplifying path of the television set rather than being adjusted at the point of the signal's input into the television set, (6) to provide a method and apparatus of maintaining uniform sound volume of the television set that operates effectively regardless of whether the change in loudness is upward or downward and one that is effective for the spectrum of deviations likely to be heard on a television set with many channels, (7) to provide such a method and apparatus that is easy to use, (8) to provide such a method and apparatus that is easy to manufacture and not cumbersome, (9) to provide a method and apparatus of maintaining uniform sound volume where the user's pushing of the START button on the television set or other audio system having the apparatus, or on the remote control device, causes a voltmeter to measure the level of the preferred or first volume of the tension on the output of the amplifier of the sound, which tension is proportionate to the sound's loudness, and to transmit that level to the RAM memory of a digital signal processor for storage,

(10) to provide a method and apparatus of maintaining uniform sound volume where the measurement of the preferred volume of the tension on the output of the amplifier of sound occurs by measuring a series of between approximately 5 and 10 volumes of this tension at definite intervals without disturbing the user and whereby the digital signal processor then calculates the mean value of these measured volumes to create the first volume of the tension that is stored,

(11) to provide a method and apparatus of maintaining uniform sound volume where the measurement of the second and subsequent volume of the tension occurs in two stages—first a crude estimate from one or two measurements to quickly adjust the sound volume toward the preferred sound volume level and then by measuring a further series of between approximately 5 and 10 volumes of the tension on the output of the sound amplifier located in the audio system at definite intervals to create a refined second or subsequent volume of the tension which is used to further adjust the volume to the preferred volume of the tension without disturbing the user,

(12) to provide such a method and apparatus of maintaining uniform sound volume from television signals regardless of the station chosen or content of the station wherein when the user subsequently switches to a second or subsequent channel the apparatus switches on and the voltmeter measures the volume of the tension of the second channel at a number of intervals, the digital signal processor calculates the mean level and once again transmits that mean volume of the tension to the RAM and wherein the digital signal processor calculates the difference between the preferred volume of the tension previously stored and the level of the tension of the second or subsequent channel and if there is a difference in volumes of tension between the two, sends an order to adjust the volume until the difference between the two becomes zero, and

(13) to provide such a method and apparatus wherein the digital signal processor turns the apparatus off after the volume of the tension is adjusted or after the digital signal processor determines that there is no need to adjust the volume.

DETAILED DESCRIPTION OF THE PREFERRED EMBODIMENT

Figure 1:
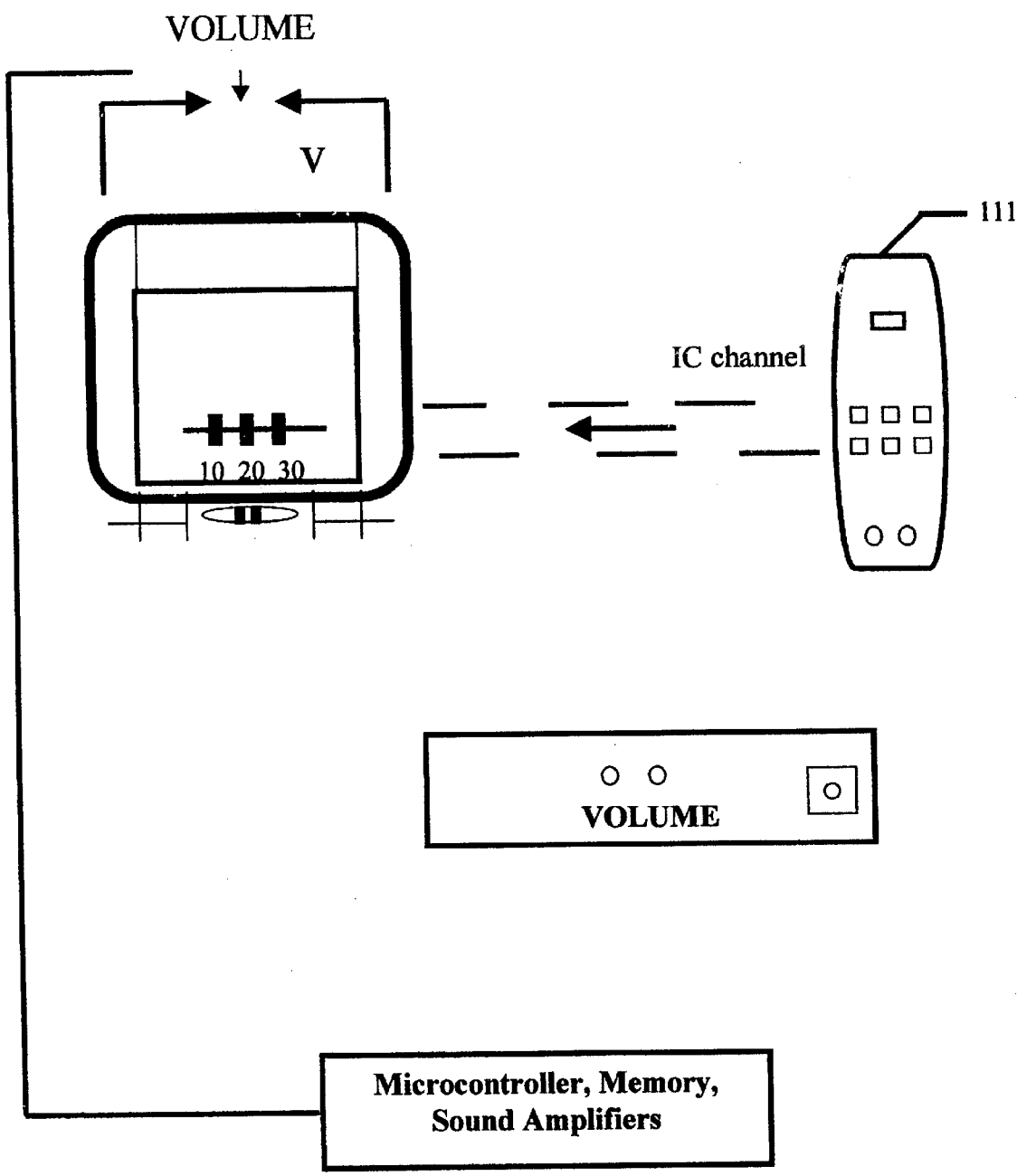
FIG. 1 is a schematic of the regulation of the level of television sound volume in a typical television receiver, including a microcontroller, memory, sound amplifier, remote control device and IC channel.

The method of the present invention is a method designed to maintain uniform sound volume of all channels heard by a user of a televison set or audio system (e.g. a radio). The method is accomplished by means of an apparatus that can be added to the existing television set or audio system or that can be manufactured to form a part of the audio system when the system is being manufactured.

The theory behind the method and apparatus of the present invention is that the loudness of the sound perceived by a user, meaning the listener and viewer of the television set, is determined by the product of two variables, (i) the amplitude of the sound signal that comes into and contacts the input element of the television set channel and (ii) the degree or multiple (or coefficient) of amplification of the sound signal in its path through the television receiver. In the case of a simple prior art television set without the apparatus of the present invention, a user would manually adjust the second variable, the degree of amplification, upward or downward to compensate for a decrease or an increase in the first variable (amplitude of the incoming sound signal) and thereby maintain the perceived loudness of the sound from the television set at desirable levels. This would be done from a remote control device or from the buttons on the front panel of the television set. However, doing this requires a constant time-consuming manual intervention each time the loudness changes when the channel is changed and this is tedious and distracting from the watching of the program.

The present invention accomplishes a uniformity of loudness automatically. The user need only select his preferred loudness level once. When the user changes channels even though the signals of the new channel vary in amplitude the perceived loudness of those signals on the ears of the listener will be maintained essentially constant due to an automatic compensatory adjustment in the degree of amplification of the signal. This is because, as explained previously, the loudness is a function of the amplitude and the coefficient of amplification of the sound signal in its path in the television receiver, and the degree of amplification of the sound signal is a constant unless changed manually or automatically through the apparatus and method of the present invention.

As seen from FIG. 3 and the description below, reference numeral "11" is used to refer to a television set having the apparatus of the present invention or in the alternative to a simplified block diagram of part of a television set having the apparatus of the present invention.

The steps of the method of the present invention are as follows. A user of the television set 11 who is listening to and viewing a first television channel experiments with the "volume" button on the television set 11 or on the remote control device 111 and thereby decides on a sound volume level that he prefers and saves it by depressing a "SAVE" button 13 extending out of the front panel of the televison set or the same button extending out of the remote control device 111. By depressing the SAVE button 13, the user causes apparatus 10 in the television set 11 to activate a voltmeter 15 that first measures the preferred volume of the tension on the output of the sound amplifier and then transmits it to RAM memory 24 to be saved by the apparatus 10. The preferred volume of the tension saved by apparatus 10 is called the first volume of the tension.

The term "tension" refers to electrical tension or stress and is measured in volts, millivolts or microvolts. Tension is directly proportionate to the loudness of the sound.

The voltmeter 15 measures the preferred volume of the tension by measuring a first series of between approximately 5 and 10 volumes of the tension emitted by the first television station at definite intervals beginning from the moment the user pushed the SAVE button 13. Each measurement is transmitted to the RAM 24 whereupon the digital signal processor 20 takes the mean of the series of measurements. The first volume of the tension thereby represents the mean or average of the first series of volumes of the tension. A series of measurements, rather than one measurement, is taken because a television program has inherent deviation in loudness depending on what is taking place in the program (e.g. walk along the beach versus loud argument).

Figure 3:
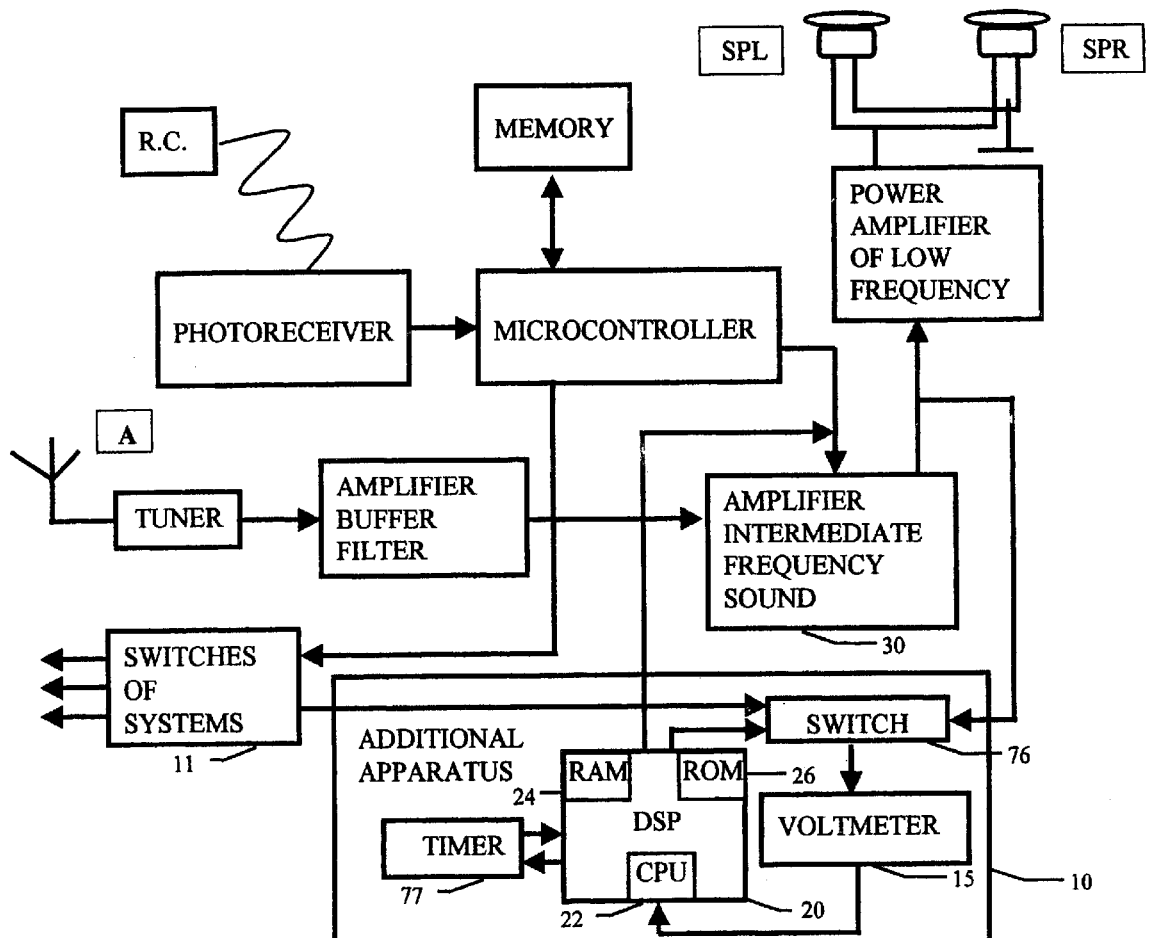
FIG. 3 is a simplified block diagram of part of a television set with the apparatus of the present invention

As best seen in FIG. 3, once the first or preferred volume of the tension is arrived at, the voltmeter 15 of apparatus 10 then transmits the first volume of the tension to the RAM 24 of a digital signal processor 20 to record the level of the first volume of the tension. Next, the digital signal processor 20 switches apparatus 10 off temporarily. While watching the television, the user may at a certain point desire to switch to a different channel. The user would do so by depressing a second channel key on the television set 11 containing apparatus 10 or on the remote control device 111 in order to activate the second television channel. When the second television channel is activated the digital signal processor 20 turns the apparatus 10 back on and this triggers the voltmeter 15 to measure the second volume of the tension emitted by the second television channel.

In one embodiment, voltmeter 15 measures a second series of between approximately 2 and 5 volumes of the tension at definite intervals beginning from the user's pushing of the second channel key. Each of the approximately 2 to 5 measurements is transmitted to the RAM whereupon the digital signal processor takes the mean of the series of measurements. The second volume of the tension thereby represents the mean or average of the second series of volumes of the tension. Once calculated, the voltmeter 15 of apparatus 10 automatically transmits the second volume of the tension to the RAM of the digital signal processor 20 to record the level of the second volume of the tension. Digital signal processor 20 then calculates the difference, if any, between the (level of the) first volume of the tension and the second volume of the tension that it has records of If that difference is positive or negative, the digital signal processor 20 sends a signal to the amplifier 30 (of intermediate sound frequency) to adjust the coefficient of amplification (meaning to increase or decrease it) of the sound and thereby adjust the second volume of the tension until that difference (between the first volume of the tension and the second volume of the tension) becomes zero. If that difference is zero, digital signal processor 20 sends a signal to switch off apparatus 10.

In a preferred embodiment, however, the voltmeter 15 measures the second and subsequent volumes of the tension emitted by the second television channel in two stages—first quickly and crudely and then through a more refined measurement. The purpose of the two stage process is so that when a second or subsequent channel is turned on by the user, the loudness is immediately adjusted, albeit imperfectly, without significant delay, in a fraction of a second—for example, within approximately three tenths of a second to approximately half a second. The more refined measurement of the second or subsequent sound volume and the consequent further adjustment in the amplification of the sound level takes longer—approximately half a minute to one or two minutes.

In this preferred embodiment, once the second volume of the tension has been measured crudely it is transmitted to the RAM of the digital signal processor 20 to record a level of the second volume of the tension, then the digital signal processor 20 calculates a difference between the first volume of the tension and the second volume of the tension, then if the difference between the first volume of the tension and the second volume of the tension is positive or negative, the digital signal processor 20 sends a signal to the amplifier (of intermediate frequency) to increase or decrease the coefficient of amplification of the sound and thereby increase or decrease the second volume of the tension until the difference between the first volume of the tension and the second volume of the tension becomes zero. If the difference is originally found to be zero, digital signal processor 20 sends a signal to switch off apparatus 10.

The amount of variation in loudness of the various channels of a television set is plus or minus approximately 20 to 25 per cent. If the difference between the preferred sound volume and the second channel's sound volume is 25%, then after the crude adjustment described above that difference will be reduced to approximately 10%. After the fine-tuning or refined measurement that difference should be reduced to no more than approximately 1 or 2%.

After the volume of the tension on the output of the sound amplifier has been adjusted in the first stage approximately toward the preferred volume of the tension, albeit not all the way to that level since the measurements of volume of the tension in the first stage were "crude" since they were based on only 1 or 2 measurements, the voltmeter 15 then makes a refined measurement of the second volume of the tension emitted by the second television channel and a refined second volume of the tension is transmitted to the RAM of the digital signal processor 20 to record a level of the refined second volume of the tension. Then, as before, the digital signal processor 20 calculates a difference between the first volume of the tension and the refined second volume of the tension, and if the difference between the first volume of the tension and the refined second volume of the tension is positive or negative, the digital signal processor 20 sends a signal to the amplifier to increase or decrease the coefficient of amplification until the difference between the first volume of the tension and the refined second volume of the tension becomes or approaches zero. Then the digital signal processor 20 turns the apparatus 10 off and the steps of the method are repeated for a third and for each subsequent television channel. If the difference between the first volume of the tension and the refined second volume of the tension are found to be zero originally, digital signal processor 20 sends a signal to switch apparatus 10 off.

In the preferred embodiment the voltmeter 15 measuring the second volume of the tension does so by measuring one or two volumes of the tension at definite intervals in a fraction of a second beginning from the pushing of the second channel key and the digital signal processor 20 takes an average of them. The voltmeter 15 makes a refined measurement of the second volume of the tension by measuring a second series of volumes of the tension at definite intervals and the refined second volume of the tension thereby represents the mean of the second series of volumes of the tension.

Once the "difference" is adjusted to zero, digital signal processor 20 turns apparatus 10 off. By "difference" is meant either the difference between the first volume of the tension and the second volume of the tension or the difference between the first volume of the tension and the refined second volume of the tension, as the case may be.

The same procedure is triggered by apparatus 10 each time the user switches to a subsequent television channel. For example, when the user pushes a third channel key on the television set 11 containing apparatus 10 or on the remote control device 111 in order to activate the third television channel, doing so causes digital signal processor 20 to turn the apparatus 10 on again. Then the voltmeter 15 measures a third volume of the tension emitted by the third television channel. In the preferred embodiment it does so in two stages, a crude and then a refined stage. In the alternative embodiment, it does so in one stage by measuring a third series of volumes of the tension at definite intervals beginning from the user's pushing of the third channel key. The third volume of the tension represents the mean of the third series of volumes of the tension. It should be noted that "third" in the phrase "third channel" merely means the third channel that the user watched whether or not there that third channel is the same as the first channel. In other words, when switching from the second channel (channel 11) back to the first channel (channel 9), that first channel is still called the third channel since there has usually been a change in the amplification level in the interim, meaning since the last time the user was at the first channel, and consequently further adjustment of the amplification level will be needed when switching back to the first channel (called the third channel), as seen from the examples provided below.

Voltmeter 15 of apparatus 10 then automatically transmits the third volume of the tension to the RAM 24 of the digital signal processor 20 to record the level of the third volume of the tension. Digital signal processor 20 then calculates the difference, if any, between the first volume of the tension and the third volume of the tension (or the refined third volume of the tension in the second stage of the preferred embodiment) that it recorded. If the difference between the first and third volumes of the tension is positive or negative, the digital signal processor 20 sends a signal to the amplifier 30 to adjust the coefficient of amplification (to increase or decrease it) until that difference becomes zero and then the digital signal processor 20 switches apparatus 10 off. If the difference is found to be zero (not positive or negative), digital signal processor 20 just sends a signal to switch apparatus 10 off. These steps are again repeated for any fourth and each subsequent television channel switched to by the viewer and to generate fourth and subsequent series of volumes of the tension.

As with the second channel, in the preferred embodiment, the third and subsequent volumes of the tension are measured in two stages as before.

EXAMPLES

Figure 2:
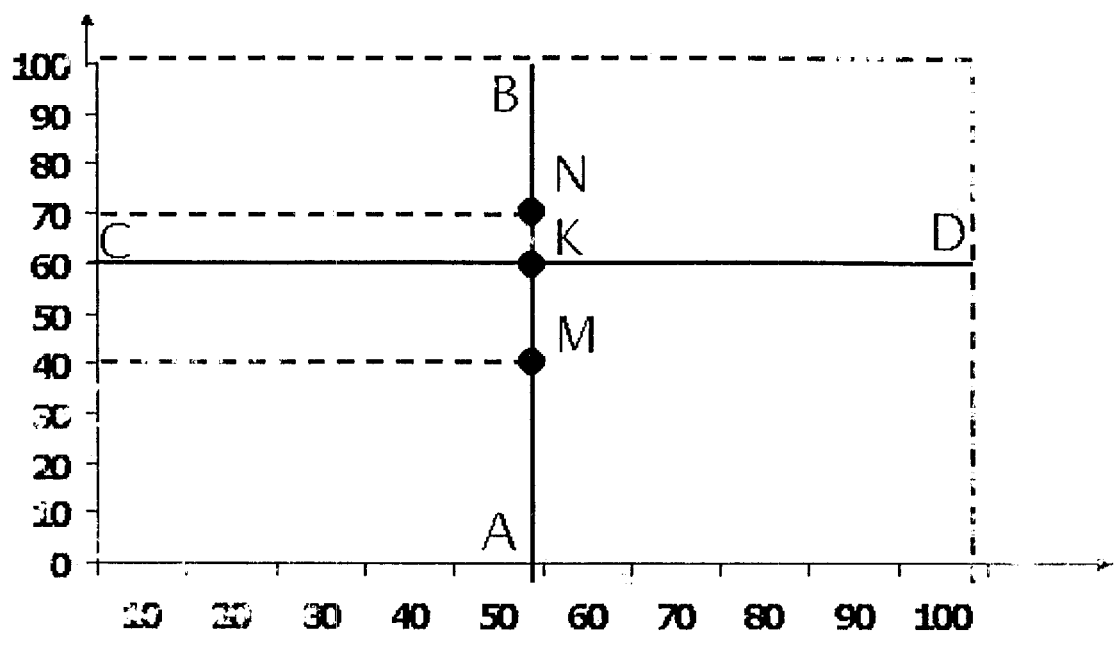
FIG. 2 is a graph of the loudness of sound signals on different channels.
Figure 4:
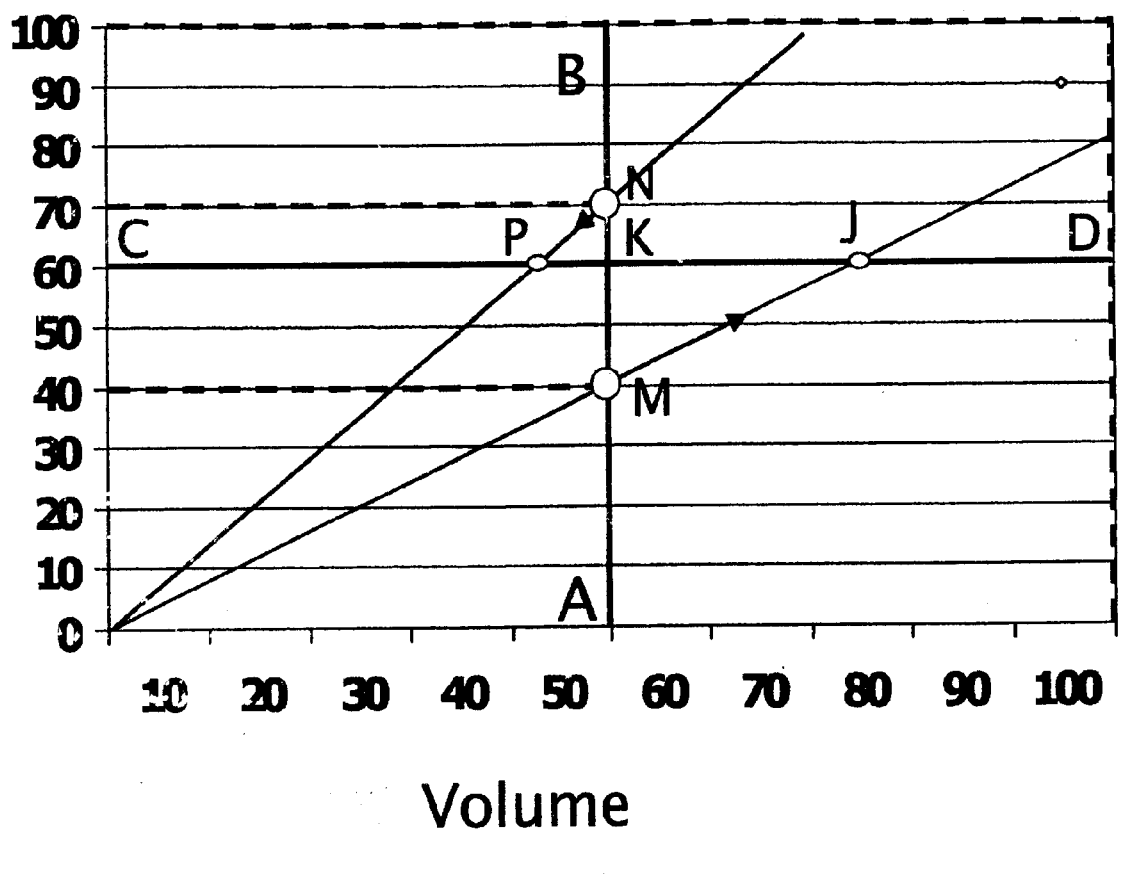
FIG. 4 is a graph of the automatic regulation of the tension on the output of the sound amplifier by adjustment of the amplification of the signal.
Figure 5:
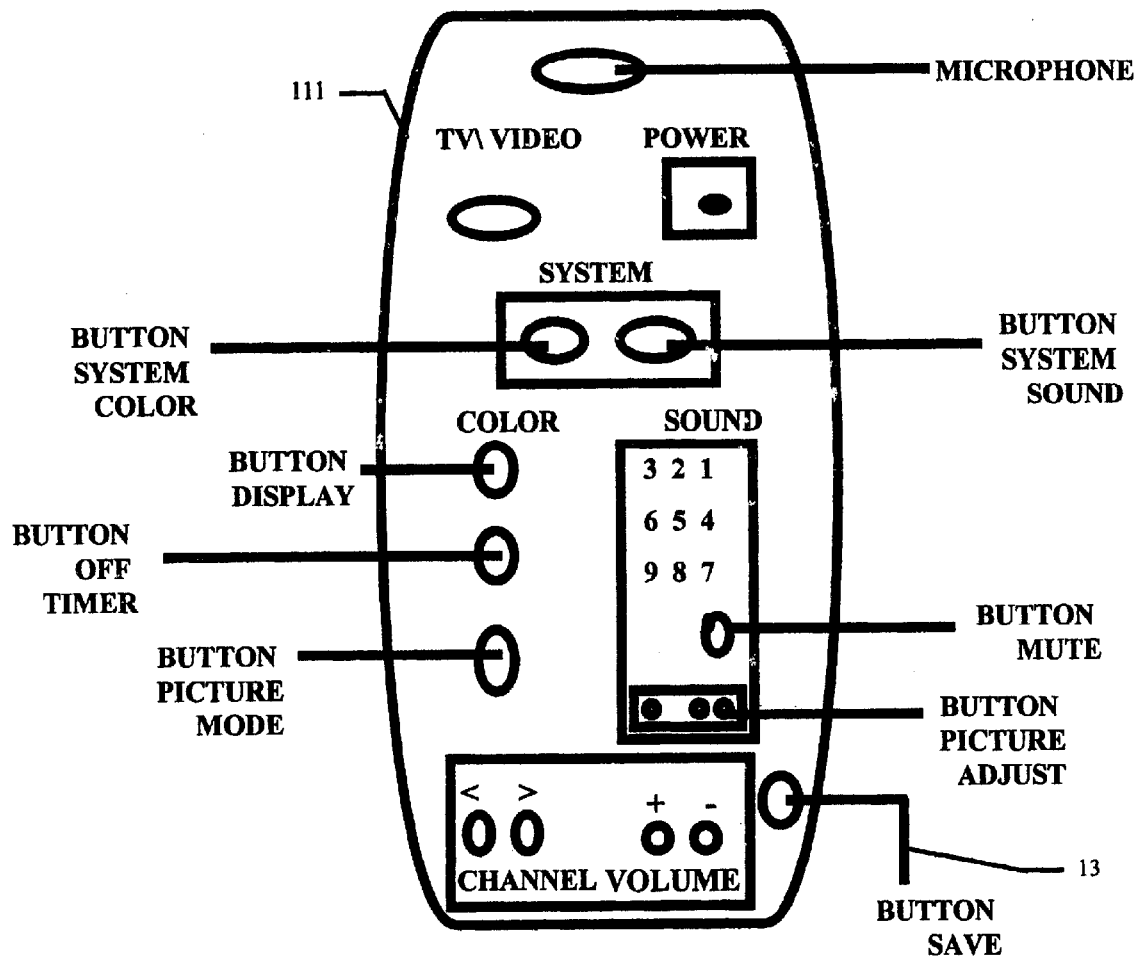
FIG. 5 is a front view of the remote control device used with a television having the apparatus of the present invention.
Figure 6:
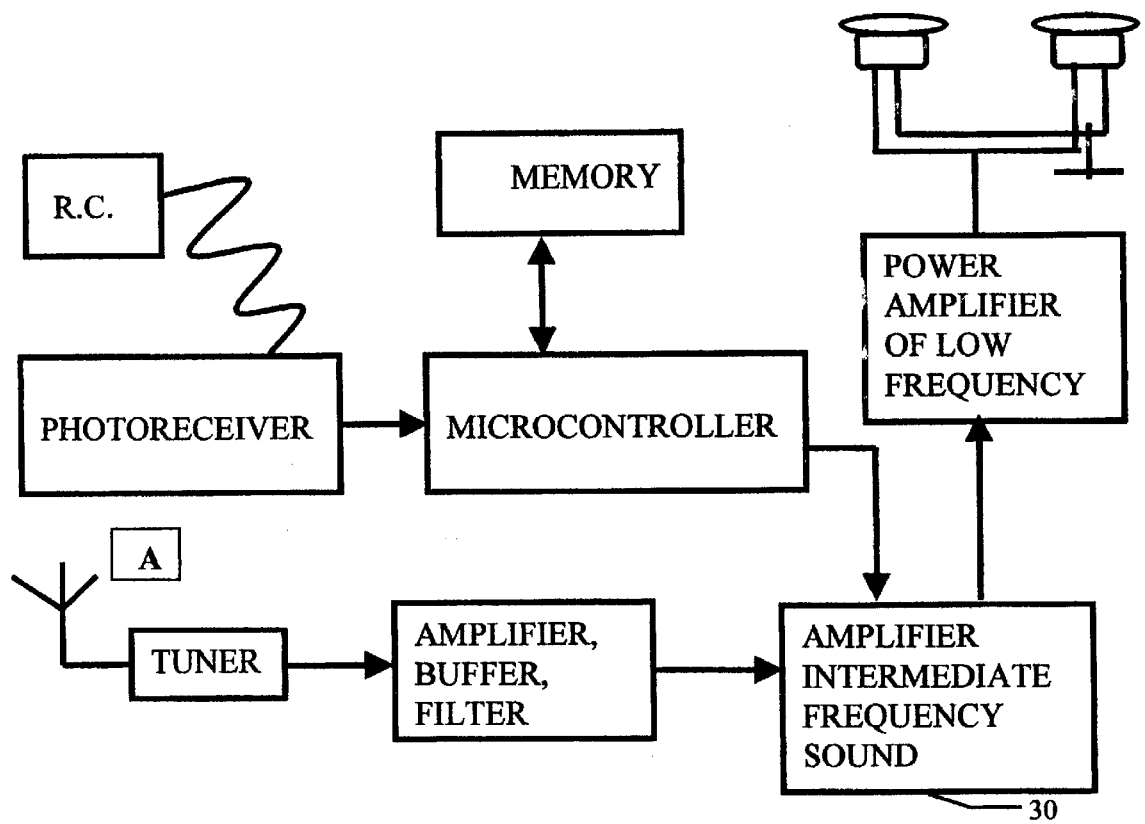
FIG. 6 is a simplified block diagram of part of a television set without the apparatus of the present invention depicting the sound path.

The following examples use FIGS. 2 and 4 to illustrate the method and apparatus of the present invention. FIGS. 2 and 4 show the linear dependence between the amplification of the signal in the path of the television receiver and the perceived loudness of a sound heard by the user. In FIG. 4 the "X" or horizontal axis represents the multiple (or coefficient) of amplification of a sound signal in its path in the television receiver whereas the "Y" or vertical axis represents the volume of the tension on the output of the sound amplifier. It should be noted that the tension on the output of the sound amplifier variable depicted in the "Y" axis is in the real world a product of the variable depicted in the "X" axis and the amplitude of the incoming sound signal. So for a given signal coming in to the input of the television set, the greater the amplification factor, the greater the volume of the tension on the output of the sound amplifier—and vice versa.

As seen in FIG. 2, line AB represents the various possible levels of perceived loudness of a sound signal when the coefficient of amplification is 55 units. For example, the user switches on the television set and chooses channel 21 and desires the loudness to be a magnitude that we represent as 60 units (see line CD) but the actual loudness he initially hears is 70 units (point N). Note that the units on the "X" axis re not the same as the units on the "Y" axis since the "Y" axis units are fractions of decibels or other measures of loudness.

Then the user moves the volume setting on the television set 11 or on the remote control 111 so that the loudness switches to channel 31 where the volume is 60 units (point K). Alternatively, the user turns on channel 31 where the loudness is 40 units. The user manually pushes the button on the TV set 11 or on the remote 111 to move it to 60 units (channel 31 would be on a different line than line AB since it probably has a different coefficient of amplification).

Each of the two lines shown on FIG. 4 represents a distinct volume of the tension on the output of the sound amplifier as it changes degree of amplification and consequently loudness. As seen in FIG. 4, let us say that the user switches on the television set and chooses channel 21 and desires the tension on the output of the sound amplifier, and corresponding to it the loudness of the sound, to be 60 units but the actual volume of the tension (and corresponding to it the loudness of the sound) he initially hears is 70 units (point N). Using volume settings on television set 11 or on remote control device 111, he manually selects the tension of 60 and then pushes the SAVE button 13 of apparatus 10 to have the apparatus 10 memorize that desired tension and corresponding to it the loudness of the sound. Then he switches to channel 31 where the tension is 40 units (point M) The apparatus 10 will move the tension on the output of the sound amplifier from 40 to 60 along the line MJ from point M to point J. This happens because when the user switched to channel 31 a different signal came in to the television input having a much lower amplitude of the signal. Since the coefficient of amplification of the signal did not automatically change, the overall tension also becomes much lower since the overall tension is directly proportional to the sound loudness and that loudness is a product of the amplitude and the amplification in the sound path of the television set 11. The apparatus 10 would automatically restore the tension (and corresponding to it the loudness of the sound) to 60 units by increasing the amplification of the signal just enough to compensate for the decrease in the amplitude of the signal. This happens, as described above, when the digital voltmeter 15 measures the tension on the output of the sound amplifier from the new channel, the digital signal processor 20 compares it with the tension of the preferred volume and the amplifier 30 adjusts the amplification. Now if the user switches back to channel 21 the tension will be represented by some point along the other line (the line containing line segment NP) and there will be an automatic adjustment to point P from whatever point on that line the user started from.

The following is a specific illustration of the method and apparatus of the present invention not depicted in the Figures. The user turns on channel 9 and its tension on the output of the sound amplifier is 1000 units of loudness (for example, fractions of decibels) because the sound signal has an amplitude of 10 and the multiple of amplification is presently set in the television set 11 to be 100. The user then manually selects 900 as the desired tension (and corresponding to it the loudness of the sound) by hitting the "volume" button that exists on any standard television set or remote control device. That means that the television set 11 changes the amplification of the sound path from 100 down to 90 (90 times 10 equals 900). Since 900 is the user's preferred volume of the tension the user then hits the SAVE button 13 and stores in the RAM memory 24 of apparatus 10 the fact that 900 is his desired tension. Next the user switches to a new channel—channel 11—and all of a sudden the tension (and corresponding to it the loudness of the sound) goes up to 1350. That occurred because the new signal on the new channel had a higher signal amplitude of 15 units and the multiple of amplification did not change from 90 (the user had manually moved it to 90 at the beginning) when the user changed channels. Now the voltmeter 15 makes a few measurements and the digital signal processor 20 finds that the mean volume of the tension is 1350 and the digital signal processor 20 makes a comparison and sees that 1350 is higher than 900. As a result the coefficient of amplification of the sound path is lowered from 90 to 60 so that the tension reaches 900. Note that 60 times 15 equals 900 and that the amplitude of signals coming to channel 11 is 15. If the user changes to channel 21 the voltmeter 15 measures the tension and the digital signal processor 20 sees that the tension is at 540 because the amplitude of the sound signals coming to channel 21 is 9 (which is a lower amplitude than either channel 9 or channel 11) and the amplification was last set by the amplifier 30 at 60 units. In order to adjust the tension (and corresponding to it the loudness of the sound) automatically from 540 to 900 (the preferred level) the apparatus 10 has to raise the amplification back up to 100 (100 times 9 equals 900).

THE APPARATUS

In order to better understand the apparatus of the present invention in conjunction with the drawings of FIGS. 1–6, the apparatus 10 and its elements are described and assigned the reference numerals identified below. As seen from FIGS. 1–6, the apparatus 10 is an addition to and forms part of an existing television set 11 with or without a remote control device 111. The apparatus 10 combined with a standard prior art television set represents modified television set 11. Modified remote control device 111 may be used to control television set 11. Apparatus 10 in television set 11 is thus used for maintaining the uniform volume of all channels and programs transmitted by the television. The apparatus 10 includes an eight-bit digital signal processor 20 that includes a central processing unit 22. It also includes RAM storage means 24 and ROM storage means 26 for recording and storing information concerning the quantitative level that a tension has in terms of its volume. RAM storage means 24 must be sufficiently large to accommodate information on tension volumes concerning up to approximately one hundred different channels, which is typically the maximum number of broadcasting channels for a television set.

Apparatus 10 includes voltmeter 15 for measuring tension on the output of the sound amplifier located in the television set or other audio system. It consists of a standard voltmeter.

Apparatus 10 also includes analog digital convertor (not shown) for converting a digital signal into an analog signal and an analog signal into a digital signal. The analog digital convertor (not shown) does this by generating voltages from the tension and converting the volume of the tension into digital signals composed of data entries.

Not included in apparatus 10 but forming part of a standard television set or audio system is a standard amplifier 30 which apparatus 10 interacts with and which is controlled by the digital signal processor 20.

A "SAVE" button 13 on the apparatus 10 protrudes from the front of television set 11 and from remote control device 111 preferably near the standard "volume" control button. SAVE button 13, when depressed, activates the voltmeter 15 that measures the volume of the tension on the output of the sound amplifier being emitted on a particular channel. As explained above it does so by measuring one or a series of volumes of the tension and transmitting the measurement(s) to the RAM 24. The digital signal processor 20 then takes the mean value of the series.

The digital signal processor 20 performs each of the functions stated above. For example, it calculates the mean of the first and subsequent series of volumes of the tension stored in RAM 24. It also calculates the difference between a first volume of the tension recorded in the RAM and a second or subsequent volume of the tension recorded in the RAM (including refined second or subsequent volumes of the tension) and if the difference between them is found to be positive, or negative, the digital signal processor 20 sends a signal to the amplifier 30 to adjust the level of the second or subsequent volumes of the tension (or refined volumes of the tension) to conform it to the level of the first or preferred volume of the tension. The digital signal processor 20 also switches apparatus 10 off after the first volume of the tension is recorded by the RAM 24. Digital signal processor 20 also switches apparatus 10 on after a new television channel is switched on (and a second or subsequent volume of the tension is registered). Digital signal processor 20 also switches apparatus 10 off after the amplifier 30 adjusts the volume of the tension upwardly or downwardly to or toward the preferred volume of the tension or it is determined by the digital signal processor 20 that the difference between the first and a subsequent volume of the tension is zero.

Digital signal processor 20 can be calibrated to consider small differences of tension to be equivalent to zero difference. A timer 77 manufactures the signals of the time (second, millisecond) for calculating a mean volume of the tension. The timer 77 is controlled by the digital signal processor 20. A switch 76 triggers apparatus 10 on or off.

The method and apparatus of the present invention also contemplates that the user while on a particular channel can change his or her mind and select a new preferred sound volume even after having already selected a preferred sound volume on a particular channel and having already pushed the "SAVE" button on the apparatus to activate the voltmeter to save that previously selected sound volume as a first volume of the tension. The user would perform the identical actions to select the new preferred sound volume as the user performed in selecting and saving the original preferred sound volume. The new preferred sound volume would then be saved as a new "first" volume of the tension. Subsequent measurements of the tension would then be called second and subsequent volumes of the tension as before since they would just have a new "first" volume of the tension as a reference point with which to be compared.

The term "user-preferred sound volume" in this patent application means the "preferred sound volume". The terms "user-preferred volume of the tension" and user-preferred volume of a tension" are interchangeable with the terms "preferred volume of the tension" and "preferred volume of a tension". Likewise, the term "user-preferred level of sound volume" means the level of the user-preferred sound volume.

The present invention contemplates that the term television can include any device, including a computer monitor, that receives audio-visual signals of the kind that are transmitted to televisions and which are heard by a listener provided that there are different channels that the user can select.

The present invention is also applicable to audio systems other than a television receiver. For example, a radio contains audio transmissions that may have different loudness levels when the listener changes channels. In addition, the present invention is applicable to CD discs and audio cassettes because when recording a CD disc or an audio cassette the level of sound may differ since parts of the CD or cassette may have been recorded in different studios or with different equipment or by different sound operators.

The present invention is also applicable to computers functioning as audio systems.

The method and apparatus of the present invention achieve the result of having a viewer be able to listen to a television set at a preferred volume regardless of what station he turns to. Furthermore, the user of the apparatus and method can select the preferred volume and alter that selection at a subsequent time.

Although the invention has been described in detail in the foregoing specification and accompanying drawings with respect to various embodiments thereof, these are intended to be illustrative only and not limiting. One skilled in the art will recognize that various modifications and variations may be made therein which are within the spirit and principles of the invention and the scope of the appended claims. It is not desired to limit the invention to the exact description and operation shown and described. The spirit and scope of this invention are limited only by the spirit and scope of the following claims.

What is claimed is:

1. An apparatus forming part of an audio system for maintaining uniform sound volume for all channels and programs transmitted by the audio system, including:
   a digital signal processor that includes a central processing unit, RAM storage means and ROM storage means,
   an analog digital convertor for converting a digital signal into an analog signal and for converting an analog signal into a digital signal,
   a voltmeter for measuring at definite intervals of time on a first channel a level of a first volume of a tension on an output of a sound amplifier of the audio system, said first volume of the tension being proportionate to a volume of sound, and for measuring at definite intervals of time on subsequent channels a level of a second or subsequent volume of the tension on the output of the sound amplifier, said voltmeter being capable of transmitting said first volume of the tension or said second or subsequent volumes of the tension to the RAM for recordation, said voltmeter being controlled by the digital signal processor,
   a SAVE button on the apparatus protruding from the audio system and/or a remote control device controlling the audio system for activating the voltmeter,
   a switch for switching the apparatus on and off,
   said digital signal processor being capable of calculating a difference between the level of the first volume of the tension recorded in the RAM and the level of the second or subsequent volume of the tension recorded in the RAM and if the difference is positive or negative sending a signal to the sound amplifier to adjust the coefficient of amplification of a sound and thereby adjust the level of the second or subsequent volume of the tension on the output until there is no difference between the level of the first volume of the tension and the level of the second or subsequent volume of the tension, and being capable, by controlling the switch, of switching the apparatus off after the level of the first volume of the tension is recorded by the RAM, switching the apparatus on after the level of the second or subsequent volume of the tension is registered and switching the apparatus off after calculating the difference between the levels of the first and second or subsequent sound volumes, and
   a timer controlled by the digital signal processor for manufacturing signals of a time used in calculating a mean volume of the tension.

2. The apparatus of claim 1, wherein the digital signal processor sends a signal to the amplifier of intermediate sound frequency if the difference is positive or negative.

3. The apparatus of claim 1, wherein the digital signal processor is an eight-bit digital signal processor.

4. An apparatus forming part of a television set for maintaining uniform sound volume for all channels and programs transmitted by the television, including:
   a digital signal processor that includes a central processing unit, RAM storage means and ROM storage means,
   an analog digital convertor for converting a digital signal into an analog signal and for converting an analog signal into a digital signal,
   a voltmeter for measuring at definite intervals of time on a first channel a level of the first volume of a tension on an output of a sound amplifier of the television set, said first volume of the tension being proportionate to a volume of sound, and for measuring at definite intervals of time on subsequent channels a level of a second or subsequent volume of the tension on the output of the sound amplifier, said voltmeter being capable of transmitting said first volume of the tension or said second or subsequent volumes of the tension to the RAM for recordation, said voltmeter being controlled by the digital signal processor,
   a SAVE button on the apparatus protruding from the television set and/or a remote control device controlling the television set for activating the voltmeter,
   a switch for switching the apparatus on and off,
   said digital signal processor being capable of calculating a difference between the level of the first volume of the tension recorded in the RAM and the level of the second or subsequent volume of the tension recorded in the RAM and if the difference is positive or negative sending a signal to the sound amplifier to adjust the coefficient of amplification of a sound and thereby adjust the level of the second or subsequent volumes of the tension on the output until there is no difference between the level of the first volume of the tension and the level of the second or subsequent volume of the tension, and being capable, by controlling the switch, of switching the apparatus off after the level of the first volume of the tension is recorded by the RAM, switching the apparatus on after the level of the second or subsequent volume of the tension is registered and switching the apparatus off after calculating the difference between the levels of the first and second or subsequent volume of the tension, and a timer controlled by the digital signal processor for manufacturing signals of a time used in calculating a mean volume of the tension.

5. The apparatus of claim 4, wherein the digital signal processor sends a signal to the amplifier of intermediate sound frequency if the difference is positive or negative.

6. The apparatus of claim 4, wherein the digital signal processor is an eight-bit digital signal processor.

7. A method of maintaining uniform volume for all channels transmitted by a television set or audio system that includes an apparatus forming part of a television set or other audio system including a digital signal processor having a central processing unit and RAM and ROM storage means, an analog digital convertor, a voltmeter, a SAVE button, a switch and a timer, comprising the steps of:

(A) selecting, while a user is listening to a first channel of the television or audio system, a user-preferred sound volume and, corresponding to the user-preferred sound volume, a user-preferred volume of a tension on an output of a sound amplifier of the audio system or televison set emitted by the first channel and heard by the user, (B) pushing the "SAVE" button on the apparatus to activate a voltmeter that measures the user-preferred volume of the tension and saves the user-preferred volume of the tension as a first volume of the tension, (C) transmitting, by means of the apparatus, the first volume of the tension to a RAM of a digital signal processor to record a level of the first volume of the tension, (D) switching the apparatus off by means of the digital signal processor, (E) pushing a second channel key on the apparatus to activate a second channel of the television or audio system, (F) turning the apparatus on by means of the digital signal processor, (G) measuring, by means of a voltmeter, a second volume of the tension emitted by the second channel of the television or audio system, (H) transmitting the second volume of the tension to the RAM of the digital signal processor to record a level of the second volume of the tension, (I) calculating a difference, by means of the digital signal processor, between the first volume of the tension and the second volume of the tension, (J) if the difference is positive or negative, sending a signal by means of the digital signal processor to the sound amplifier to increase or decrease the coefficient of the amplification of the sound amplifier until the difference becomes zero, (K) turning the apparatus off by means of the digital signal processor and (L) repeating steps (E) through (K) for a third and for each subsequent channel of the television or audio system.

8. The method of claim 7, wherein said voltmeter measuring the user-preferred volume of the tension does so by measuring a first series of volumes of the tension at definite intervals beginning from the pushing of the SAVE button, said first volume of the tension thereby representing the mean of the first series of volumes of the tension, and wherein said voltmeter measuring the second or subsequent volume of the tension does so by measuring a second or subsequent series of volumes of the tension at definite intervals beginning from the pushing of the second or subsequent channel key, said second volume of the tension thereby representing the mean of the second or subsequent series of volumes of the tension.

9. The method of claim 7, wherein the user who wishes to change a user-preferred level of sound volume previously selected does so by selecting a new user-preferred sound volume (and corresponding to the new user-preferred sound volume a new volume of a tension on the output of the sound amplifier) and saving the new user-preferred sound volume as a new first volume of the tension and then following steps (C) through (L) for the new user-preferred sound volume.

10. A method of maintaining uniform volume for all channels transmitted by a television set or audio system, which television set or audio system includes an apparatus forming part of the television set or audio system, said apparatus including a digital signal processor having a central processing unit and RAM and ROM storage means, an analog digital convertor, a voltmeter, a SAVE button, a switch and a timer, comprising the steps of:

(A) selecting, while listening to a first channel of the television or audio system, a user-preferred sound volume, and corresponding to the user-preferred sound volume, a user-preferred volume of a tension on an output of a sound amplifier of the audio system or television set, emitted by the first channel and heard by the user, (B) pushing the "SAVE" button on the apparatus to activate a voltmeter that -measures the user-preferred volume of the tension and saves the user-preferred volume of the tension as a first volume of the tension, (C) transmitting, by means of the apparatus, the first volume of the tension to a RAM of a digital signal processor to record a level of the first volume of the tension, (D) switching the apparatus off by means of the digital signal processor, (E) pushing a second channel key on the television set to activate a second channel of the television or audio system, (F) turning the apparatus on by means of the digital signal processor, (G) measuring, by means of the voltmeter, a second volume of the tension emitted by the second channel of the television or audio system quickly and crudely, (H) transmitting the second volume of the tension to the RAM of the digital signal processor to record a level of the second volume of the tension, (I) calculating a difference, by means of the digital signal processor, between the first volume of the tension and the second volume of the tension, (J) if the difference between the first volume of the tension and the second volume of the tension is positive or negative, sending a signal, by means of the digital signal processor, to the amplifier of intermediate frequency of sound to increase or decrease the coefficient of the amplification until the difference between the first volume of the tension and the second volume of the tension becomes zero, (K) making a refined measurement, by means of the voltmeter, of the second volume of the tension emitted by the second channel of the television or audio system, (L) transmitting a refined second volume of the tension to the RAM of the digital signal processor to record a level of the refined second volume of the tension, (M) calculating a difference, by means of the digital signal processor, between the first volume of the tension and the refined second volume of the tension, (N) if the difference between the first volume of the tension and the refined second volume of the tension is positive or negative, sending a signal, by means of the digital signal processor, to the amplifier to increase or decrease the coefficient of the amplification of the sound amplifier until the difference between the first volume of the tension and the refined second volume of the tension becomes zero, (O) turning the apparatus off by means of the digital signal processor and (P) repeating steps (E) through (O) for a third and for each subsequent channel of the television or audio system.

11. The method of claim 10, wherein said voltmeter measuring the second or subsequent volume of the tension does so by measuring one or two volumes of the tension at definite intervals in a fraction of a second beginning from the pushing of the second or subsequent channel key and taking an average, and wherein said voltmeter making a refined measurement of the second or subsequent volume of the tension does so by measuring a second or subsequent series of volumes of the tension at definite intervals, said refined second volume of the tension thereby representing the mean of the second or subsequent series of volumes of the tension.

12. The method of claim 10, wherein the user who wishes to change a user-preferred level of sound volume previously selected does so by selecting a new user-preferred sound volume, and corresponding to the new user-preferred sound volume a new volume of a tension on the output of the sound amplifier, and having the new volume of the tension saved as a new first volume of the tension and then following steps (C) through (L) for the new user-preferred sound volume.

* * * * *